United States Patent Office 3,592,734
Patented July 13, 1971

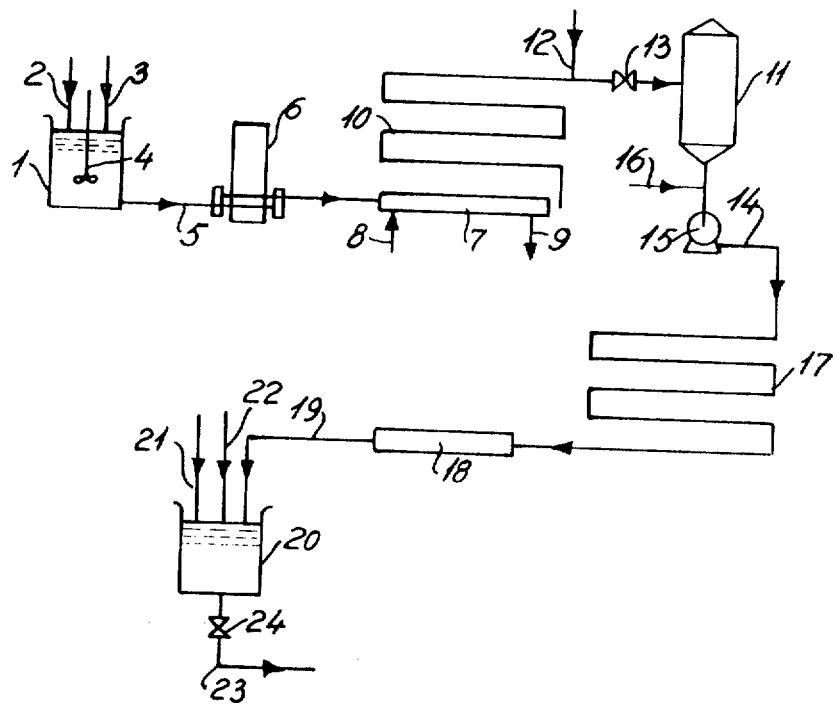

3,592,734
PROCESS FOR CONVERTING STARCH AND OTHER POLYSACCHARIDES INTO DEXTROSE AND MALTOSE CONTAINING PRODUCTS
Karl K. K. Kroyer, Vestre Kongevej 80,
Aarhus Viby, Denmark
Continuation of application Ser. No. 577,302, Sept. 6, 1966. This application July 28, 1969, Ser. No. 849,243
Claims priority, application Denmark, Sept. 9, 1965, 4,627
Int. Cl. C12b 1/00
U.S. Cl. 195—31                               10 Claims

ABSTRACT OF THE DISCLOSURE

An improved process for converting starch and starch-containing material into dextrose and maltose containing products having a high DE value is disclosed. The process comprises the steps of subjecting starch milk to acid hydrolysis under superatmospheric pressure and at a temperature above 100° C. to obtain a product having a DE value below 10. The product is then neutralized and cooled after which it is subjected to enzymatic liquefaction and finally to enzymatic saccharification.

---

This application is a continuation of application Ser. No. 577,302, filed Sept. 6, 1966 and now abandoned.

This invention relates to a process for converting starch and other polysaccharides into dextrose and maltose containing products, said process comprising the steps of subjecting starch milk or a similar polysaccharide product first to a liquefaction and then to an enzymatic saccharification.

It is well known to prepare dextrose and maltose containing products by an acid hydrolysis of starch. In said prior art process the starch milk to which acid, e.g. sulphuric acid or hydrochloric acid, has been added is heated to a temperature of between 120 and 140° C.

A drawback of said prior art process is that the DE-values of the end products are relatively low, viz not higher than 90. This is due to the fact that during the hydrolysis a state of equilibrium is formed between the desired conversion products and the so-called reversion products, which are formed by reaction between the conversion products.

It has been attempted to eliminate the problems attached to the formation of said reversion products by subjecting the starch milk first to an acid hydrolysis, thereafter stopping said hydrolysis by adding a base, and finally adding saccharification enzymes to effect an enzymatic saccharification.

This process, however, still does not result in the obtaining of end products having DE-values of 95 and higher, such as is desirable, because the saccharification enzymes are unable to break down the reversion products formed during the acid hydrolysis.

Therefore, when preparing starch conversion products having such high DE-values enzymatic processes have hitherto been used. When carrying out such a well known enzymatic process, a mixture of starch milk and liquefaction enzyme is heated to a temperature higher than the gelatinization temperature of the starch, e.g. to a temperature of about 85° C. This temperature is maintained for a few minutes and the liquefied product is then cooled to a temperature of about 60° C. and passed to a saccharification tank to which saccharification enzyme is added and which is maintained at a temperature of 60° C. for 3–4 days. In this manner it is possible to prepare a conversion product having a DE-value of 95–98 or higher.

However, the saccharified product contains minor amounts of undissolved products such as unconverted or only partially converted starch and insoluble products other than saccharides present in the starting material. Therefore, said undissolved products should be removed, which is ordinarily carried out by filtration before the dextrose and maltose containing solution is evaporated. Such a filtration process, however, is troublesome and time consuming because said undissolved products tend to clog the filter pores.

It has been proposed to reduce the proportion of undissolved products in the saccharified product by performing the liquefaction in two separate steps and heating the starch product in an intermediate step to a temperature well above 100° C. and adding a further amount of liquefaction enzyme after said intermediate heating step. This intermediate heating causes part of the starch molecules which cannot be converted by the enzymes to be thermally broken down. However, due to the addition of a further amount of enzymes, the consumption of enzymes is relatively high.

The object of the invention is to provide a process of the above mentioned type for obtaining an end product having a high DE-value without a simultaneous formation of products tending to cause difficulties in the filtration of said end product.

According to the invention starch milk is subjected to a mild acid treatment under pressure and is at the same time heated to a temperature of about 100° C. whereafter the acid treated product is neutralized and cooled to a pH-value and temperature suitable for liquefaction, and the product thus formed is subjected to an enzymatic liquefaction and finally to an enzymatic saccharification.

As used herein the term "mild acid treatment" is intended to define a hydrolysis of the starch or polysaccharide such that the DE-value does not exceed 10 when said treatment has been completed. Such a mild acid treatment may be carried out either as a short treatment with a strong acid or as a longer treatment with a weaker acid. The acid treatment is preferably carried out in a period of about 5 minutes and at a pH-value of 1.8–2.5 while heating to a temperature of about 140° C. However, it is observed that a lower temperature may also be used provided the product is treated for a longer time.

During the mild acid treatment an initial hydrolysis of the starch grains takes place thereby decreasing the viscosity of the heated starch milk to such an extent that it may be pumped through a tubular heat exchanger. During the heating of the starch grains to such high temperature above 100° C. the crystalline parts of the starch grains, the so-called crystallites, are broken down. The molecule chains or threads of said crystallites are not broken down during a normal enzymatic liquefaction and it is believed that these non-converted or only partially converted molecules cause the problems encountered during the filtration of the end products of the prior art processes.

When the product formed during the acid treatment has been neutralized and an amount of liquefaction enzymes has been added, the enzymes may more readily attack and break down the molecule chains and threads liberated during the decomposition of the crystallites.

The acid treatment, however, should be short and mild to avoid that the conversion products react with each other to any substantial extent to form the above mentioned reversion products.

Thus, the product which after cooling and addition of a saccharification enzyme is to be subjected to an enzymatic saccharification, only contains very small amounts of materials which cannot be broken down by the saccharification enzymes.

It is important that the cooling of the product subjected to the mild acid treatment is carried out quickly and that the liquefaction enzyme is added thereto at once. This is due to the fact that starch tends to retrograde at a low temperature to form products which cannot be broken down during the enzymatic liquefaction and the subsequent enzymatic saccharification. Therefore, the cooling of the neutralized product is preferably carried out in a flash cyclone and liquefaction enzyme is added at the same time at the bottom of said cyclone. Thereby the liquefaction enzymes are thoroughly mixed with the cooled product and said enzymes begin to function immediately after the cooling to the liquefaction temperature.

The enzymatic liquefaction is preferably carried out at a temperature of about 88° C. while the product is passed through a converter pipe.

When the liquefaction has been completed, the product is cooled to saccharification temperature, e.g. a temperature of about 60° C. and is introduced into a saccharification tank to which the saccharification enzyme is added.

In a preferred embodiment of the invention the acid treated product is subjectd to a treatment at a temperature of above 100° C. when the neutralization has taken place, but before the cooling and the addition of liquefaction enzyme. This results in a further decomposition of the crystallites without a further formation of reversion products.

The invention also relates to an apparatus for carrying out the process described above. The apparatus according to the invention comprises, in series, a heat exchanger, means for pressing starch milk with acid added tthereto through said heat exchanger under high pressure, means for introducing a base to neutralize the acidified starch milk, a first cooler for effecting a quick cooling of the neutralized product, means for introducing liquefaction enzyme, means for pressing the neutralized cooled product with liquefaction enzyme added thereto through a converter and through a second cooler to a saccharification tank which is provided with means for introducing a saccharification enzyme. The heat exchanger used for heating the starch milk with acid added thereto, is preferably constructed as disclosed in British Pat. No. 715,425. When using such a heat exchanger the starch material is heated quickly so that clogging of the heat exchanger is avoided, when passing through the gelatinization temperature range of the starch.

According to a preferred embodiment of the invention the apparatus further comprises means, mounted between the means for introducing a base and the first cooler, for subjecting the acid treated product to a heat treatment at above 100° C.

The invention will now be described in further detail with reference to the accompanying drawing which shows a flow diagram of a preferred embodiment of the apparatus according to the invention.

In the drawing, 1 is a vessel containing starch milk and acid, which are supplied thereto through pipes 2 and 3, respectively. The vessel 1 is also provided with a stirrer 4 and is connected through a pipe 5, in which a diaphragm pump is inserted to a heat exchanger 7 of the type disclosed in British Pat. No. 715,425. Said heat exchanger 7 is provided with a pipe 8 for supplying heating steam thereto and another pipe 9 for discharging non-condensed steam and condensate therefrom. The outlet end of said heat exchanger 7 is connected to a converter pipe 10, the other end of which is connected to a flash cyclone 11. In front of the flash cyclone 11 there is provided a pipe 12 for introducing a base into the converter pipe, and a backpressure valve 13. The lower end of the flash cyclone is connected to a pipe 14 in which a pump 15 is inserted. The pipe 14 is also provided with a branch pipe 16 for introducing liquefaction enzyme. The pipe 14 connects the flash cyclone with one end of another converter pipe 17 the other end of which is connected to a cooler 18 which in turn is connected through a pipe 19 to saccharification tank 20. The tank 20 is provided with pipes 20 and 21 for introducing saccharification enzyme and acid, respectively. A pipe 23 in which a valve 24 is inserted is connected to the bottom of the tank 20.

The apparatus shown in the drawing operates in the following manner:

Starch milk is continuously introduced into the vessel 1 through the pipe 2 and at the same time acid, e.g. hydrochloric acid, is introduced through the pipe 3. When the hydrochloric acid is added, the pH-value of the contents of the container is lowered to between 1.8 and 2.5. The starch milk with acid added thereto is pumped from the vessel 1 into the heat exchanger 7 by the pump 6. In the heat exchanger 7 the temperature of the product is quickly increased to above 100° C., preferably to about 140° C., by steam heating. This quick heating of the starch material with acid added thereto initiates a liquefaction of the gelatinized starch solution. This results in such a reduction of the viscosity that the starch may be pumped through the heat exchanger and further on through the converter pipe 10. The pressure in the heat exchanger 7 and converter pipe 10 is maintained at a level higher than the pressure of saturated steam at the temperature in question because, to obtain a quick heating, it is essential that only a negligible amount of water in the starch product evaporates. Preferably, the pressure in the heat exchanger and the converter pipe is maintained at 15–30 atmospheres, but higher pressures may also be used if this is found necessary in order to obtain a suitable flow rate.

At the outlet end of the converter pipe 10 a base, e.g. sodium carbonate solution, is introduced into the pipe 12. The product is present in the heat exchanger and the converter pipe for a relatively short time viz of the order of 5 minutes and thereby it is avoided that the liquefaction proceeds to such an extent that insoluble and unconvertible reversion products are formed.

When the neutralized product has passed the back pressure valve 13 it flows into the flash cyclone 11 in which the pressure is suddenly relieved which results in evaporation of part of the water in the neutralized product. At the same time the product is suddenly cooled and the temperature is almost instantaneously brought down to the liquefaction temperature i.e. about 88° C. Immediately thereafter, liquefaction enzyme, e.g. bacterial alfa-amylase, is added through the pipe 16. The amount of liquefaction enzyme added is of the order of 250–300 SKB-units per 100 g. dry starch.

The mixture of the neutralized cooled product and liquefaction enzyme is then pumped into the converter pipe 17 by the pump 15 and in said converter pipe a total liquefaction of the product takes place at the above mentioned temperature of about 88° C. The product is present in the flash cyclone 11 and the converter pipe 17 for a total of about 20–30 minutes.

When the liquefied product has left the converter pipe 17 it is passed into the cooler 18 in which it is cooled to a temperature of about 60° C. which is the optimum saccharification temperature when using amyloglucosidase as saccharification enzyme. The cooled liquefied product is introduced into the tank 20 and at the same time saccharification enzyme is introduced through the pipe 21 and acid through the pipe 22 to lower the pH-value to 4–4.5. When the product has stayed in the tank 22 for about 72–90 hours at a temperature of about 60° C. it has attained a DE-value of about 97 and it is then passed through the pipe 21 to a filtration apparatus (not shown) in which the undissolved ingredients are removed before the product is concentrated by evaporation.

I claim:

1. A process for converting starch into dextrose and maltose containing products having a high DE value comprising the steps of subjecting starch milk to acid hydrolysis under superatmospheric pressure and at a temperature above 100° C. to break down the crystalline parts of the starch grains and to obtain a product having a DE value below 10, quickly neutralizing and cooling said product to a pH and temperature suitable for liquefaction, immediately subjecting said neutralized and cooled product to enzymatic liquefaction to produce a liquefied product, and then subjecting the liquefied product to enzymatic saccharification.

2. A process as claimed in claim 1 wherein the neutralized product is maintained at a temperature above 100° C. to permit further thermal decomposition before being cooled.

3. A process as claimed in claim 1 wherein said acid hydrolysis is conducted at a pH between 1.8 and 2.5.

4. A process as claimed in claim 1 wherein said acid hydrolysis is conducted at a temperature of about 140° C.

5. A process as claimed in claim 1 wherein said acid hydrolysis is conducted under a pressure of between 15 and 30 atmospheres.

6. A process as claimed in claim 1 wherein said enzymatic liquefaction is conducted at a temperature of about 88° C.

7. A process as claimed in claim 1 wherein said enzymatic saccharification is conducted at a temperature of about 60° C.

8. A process as claimed in claim 1 wherein said liquefaction enzyme is bacterial alpha-amylase.

9. A process as claimed in claim 1 wherein said saccharification enzyme is amyloglucosidase.

10. A process as claimed in claim 1 wherein said saccharification is conducted at a pH between 4 and 4.5.

References Cited

UNITED STATES PATENTS

| | | | |
|---|---|---|---|
| 2,891,869 | 6/1959 | Langlois | 195—31 |
| 3,039,935 | 6/1962 | Rentshler et al. | 195—31 |
| 3,137,639 | 6/1964 | Hurst et al. | 195—31 |

ALVIN E. TANENHOLTZ, Primary Examiner